United States Patent [19]

Lussiez et al.

[11] Patent Number: 4,547,347
[45] Date of Patent: Oct. 15, 1985

[54] GRANULOMETRIC CONTROL OF NICKEL SULFIDE PRECIPITATE

[75] Inventors: Guy W. Lussiez, Golden; Lauren B. Ames, Wheat Ridge, both of Colo.

[73] Assignee: AMAX Inc., Greenwich, Conn.

[21] Appl. No.: 557,504

[22] Filed: Dec. 2, 1983

[51] Int. Cl.⁴ ............................................. C01G 53/00
[52] U.S. Cl. .................... 423/141; 423/140; 423/566
[58] Field of Search ............... 75/119, 108, 109, 115; 423/140, 141, 142, 561 R, 150, 566

[56] References Cited

U.S. PATENT DOCUMENTS 4,110,400 8/1978 Jha et al. .................... 423/141

FOREIGN PATENT DOCUMENTS 540517 5/1951 Canada ..................... 75/119

*Primary Examiner*—John Doll
*Assistant Examiner*—Robert L. Stoll
*Attorney, Agent, or Firm*—Michael A. Ciomek; Eugene J. Kalil

[57] ABSTRACT

A process wherein nickel in an aqueous stream is recovered as nickel sulfide by precipitation in an autoclave with pressurized hydrogen sulfide in the presence of a large quantity of recycled fine nickel sulfide seed material is improved when operated under continuous conditions by introducing into the autoclave a small, controlled quantity of supplemental seed material designed to maintain the seed surface area within required limits.

2 Claims, 3 Drawing Figures

GRANULOMETRIC CONTROL OF NICKEL SULFIDE PRECIPITATE

This invention relates to the precipitation of nickel and cobalt as sulfides from sulfate solutions, such as the dilute solutions obtained in the hydrometallurgical recovery of nickel and cobalt from lateritic ores.

BACKGROUND OF THE INVENTION AND THE PRIOR ART

As is pointed out in U.S. Pat. No. 4,110,400, the recovery of nickel and cobalt from acidic leach solutions by precipitation as sulfides using hydrogen sulfide under pressure has been applied in the Moa Bay plant in Cuba. The process has been studied at length and much progress has been made in terms of overall recovery of nickel and cobalt, economy in energy and reactant requirements, sulfide product granulometry and purity, production rate, etc. The said U.S. Pat. No. 4,110,400 constituted a major advance since the process there disclosed permits use of hydrogen sulfide at relatively low pressures and temperatures while maintaining high production rates. Greater safety, simplification of equipment, reductions in internal scaling, corrosion and maintenance have resulted.

Briefly, the process described in U.S. Pat. No. 4,110,400 contemplates production of nickel sulfide by sulfide precipitation from an acidic solution containing up to 40 gpl nickel, e.g., up to 15 gpl nickel, about 30 to about 400 gpl of a soluble inert sulfate such as magnesium sulfate, and a pH of about 1.5 to about 4. The soluble inert sulfate acts as an acid buffer to combine with hydrogen ions formed during the precipitation of nickel so as to form $HSO_4$ ion. Finely divided nickel sulfide in the amount of at least 75 gpl of nickel-containing solution is used as seed during nickel sulfide precipitation from the solution using hydrogen sulfide under pressure of up to 50 psig and temperature of 65° to 100° C. Provision for introduction of MgO slurry for control purposes was made. Many advantages result from the process described in U.S. Pat. No. 4,110,400, but it is found that when the sulfide precipitation reactor or autoclave is operated on a continuous basis for an extended time period that the nickel sulfide production rate decreases to an unacceptable extent. It is to the solution of this problem that the present invention is directed.

SUMMARY OF THE INVENTION

The present invention is based upon the discovery that the particle size distribution and quantity of nickel sulfide seed material introduced into the reactor along with the nickel-containing solution to be treated by hydrogen sulfide to recover the nickel content thereof as nickel sulfide is controlled to provide a seed surface area within the ranges of about 10,000 square centimeters per liter of solution to about 30,000 or 40,000 square centimeters per liter of solution and a total seed solids inventory of at least about 75 up to about 300 grams per liter of solution, respectively, to enable continuous production of nickel sulfide at a high production rate and with high recovery of nickel over an extended period of time. Preferably, the total seed surface area is in the range of about 15,000 to about 20,000 square centimeters per liter. This is accomplished by feeding a supplemental new source of fine nickel sulfide seed material to the reactor along with the recycle fine nickel sulfide and material recovered from the reaction product. It will be appreciated that, for a given weight of nickel sulfide particles suspended in the reactor, the particle surface area will increase as the average particle diameter is decreased. It must be understood that this surface area plays an important part in limiting the rate of scaling of autoclave surfaces and in controlling the rate of reaction and thereby the particle size distribution of the product. A surface area concentration below about 10,000 square centimeters per liter is insufficient to carry out the sulfide precipitation reaction in an economical time. A surface area concentration above about 40,000 square centimeters per liter does not permit a high enough particle growth rate.

Control of seed surface area is important because it results in controlled rate of reaction of the sulfide precipitation reaction, reduces the scale formation in the autoclave, and provides particle size control of the reaction product. This control is effected by regulation of the amount and size of ground seed added, by the seed concentration, and by the efficiency of particle size classification.

DETAILED DESCRIPTION OF THE INVENTION

Figure 1:
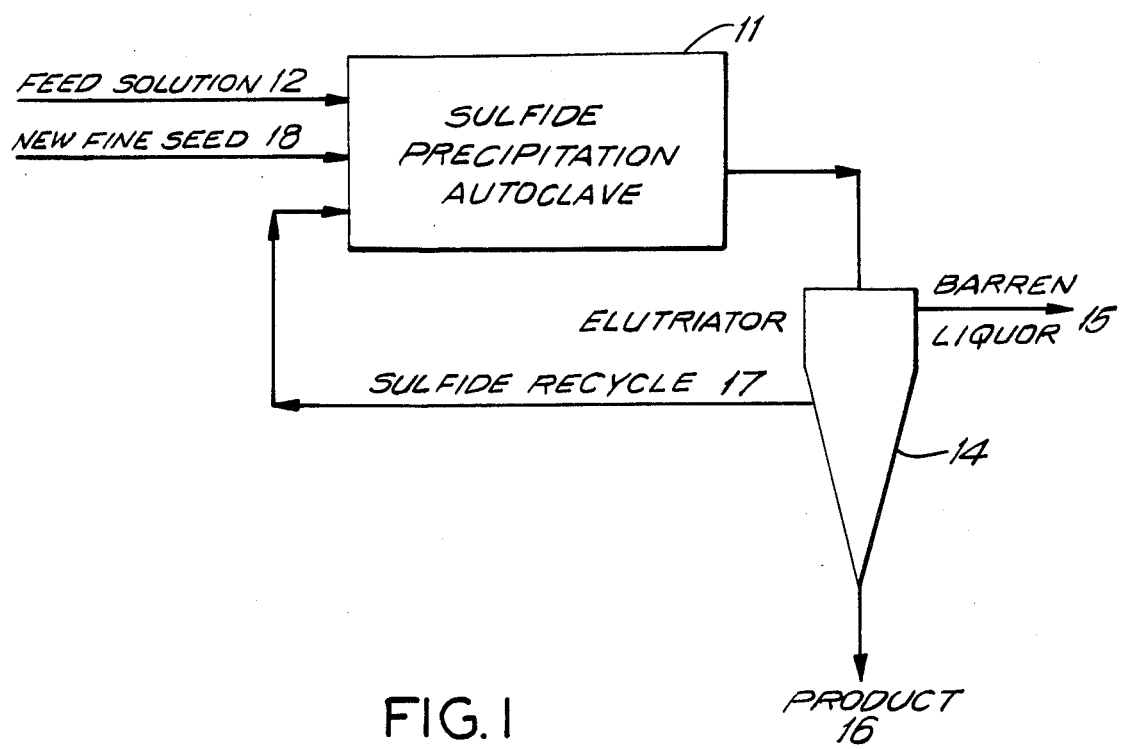
FIG. 1 depicts schematically the portion of the sulfide precipitation operation to which the present invention appertains.

With particular reference to FIG. 1 of the drawing, reference character 11 represents a sulfide precipitation autoclave wherein the nickel content of a nickel-containing feed solution 12 will be precipitated as nickel sulfide by using hydrogen sulfide 13 (see FIG. 2) under pressure as a precipitant. When operating in continuous mode, the resultant products generated in the autoclave are subjected to solids-liquids separation as in elutriator 14 to provide a barren liquor 15, a solid product 16 constituting the coarser solids emanating from the autoclave and a sulfide recycle 17 which is returned to autoclave 11. It is to be understood that precipitation of nickel sulfide within the autoclave occurs in an environment of nickel sulfide particles suspended in the solution from which nickel is being precipitated by pressurized hydrogen sulfide. Newly precipitated nickel sulfide accretes upon pre-existing nickel sulfide seed particle surfaces. The seed surface will typically be 100 times or more of the reactor internal surface area. Kinetics of the precipitation reaction are dependent upon the presence of suspended particles, as is completeness of the precipitation reaction. However, only a small proportion of the nickel sulfide particles exiting from the reactor will be sufficiently coarse to be recovered as product particles. Instead, a large proportion of the nickel sulfide particles must be recycled and many trips through the reactor (typically forty or several hundred trips) will be required before an initially fine particle can be withdrawn from the system as product. New fine seed 18 is introduced either continuously or periodically to maintain a substantially constant size distribution of the total load of seed in the reactor and thereby to maintain the kinetics of the system.

Figure 2:
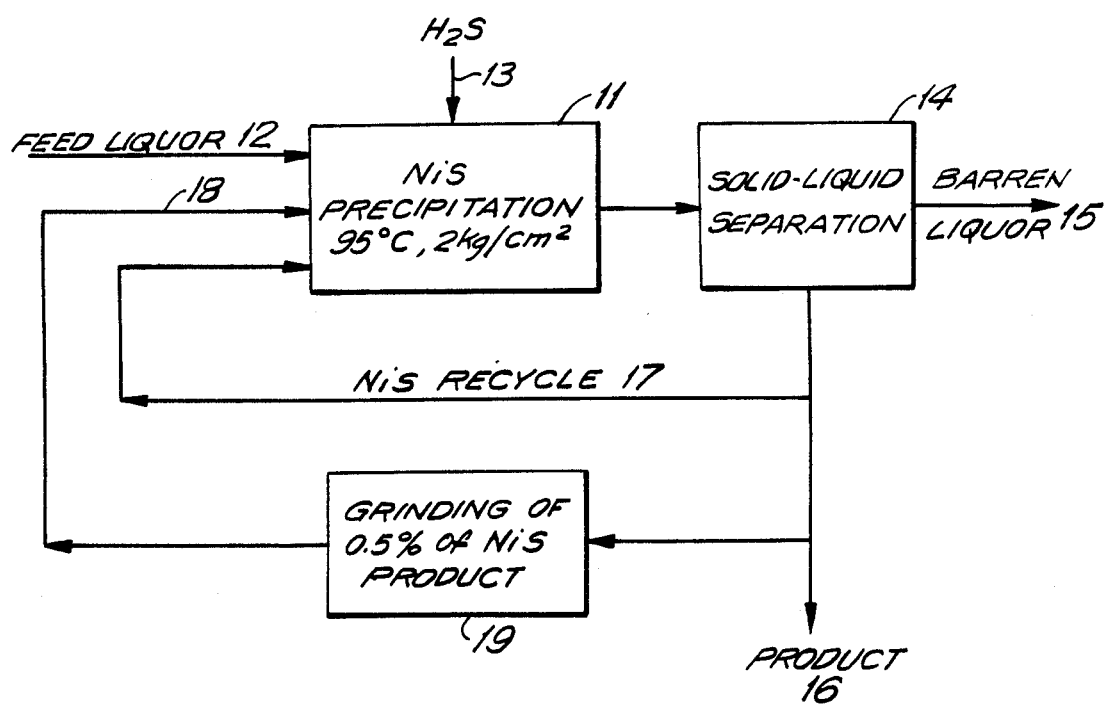
FIG. 2 depicts schematically the process of the invention particularly showing the recycle of seed materials.

FIG. 2 depicts an instance in which a feed liquor 12 containing approximately 5 gpl nickel was treated with H₂S 13 at 95° C. and at an absolute pressure of 2 kilograms/cm², and then subjected to solid-liquid separation 14. About 120 kg/hr of nickel sulfide exited reactor 11 and about 12 kg/hr of product 16 was removed, with the remainder or 108 kg/hr of finer nickel sulfide being recycled as indicated at 17. Product 16 had an average particle size of about 100 micrometers. As indicated at 19, new fine seed 18 was generated by grinding a small proportion of product 16, it being found that only about 0.25%, by weight, of product 16, or 30 grams per hour, needed to be provided as new fine seed. The new fine seed was ground to an average particle size of 12 μm. A nickel recovery of over 99% was maintained.

Figure 3:
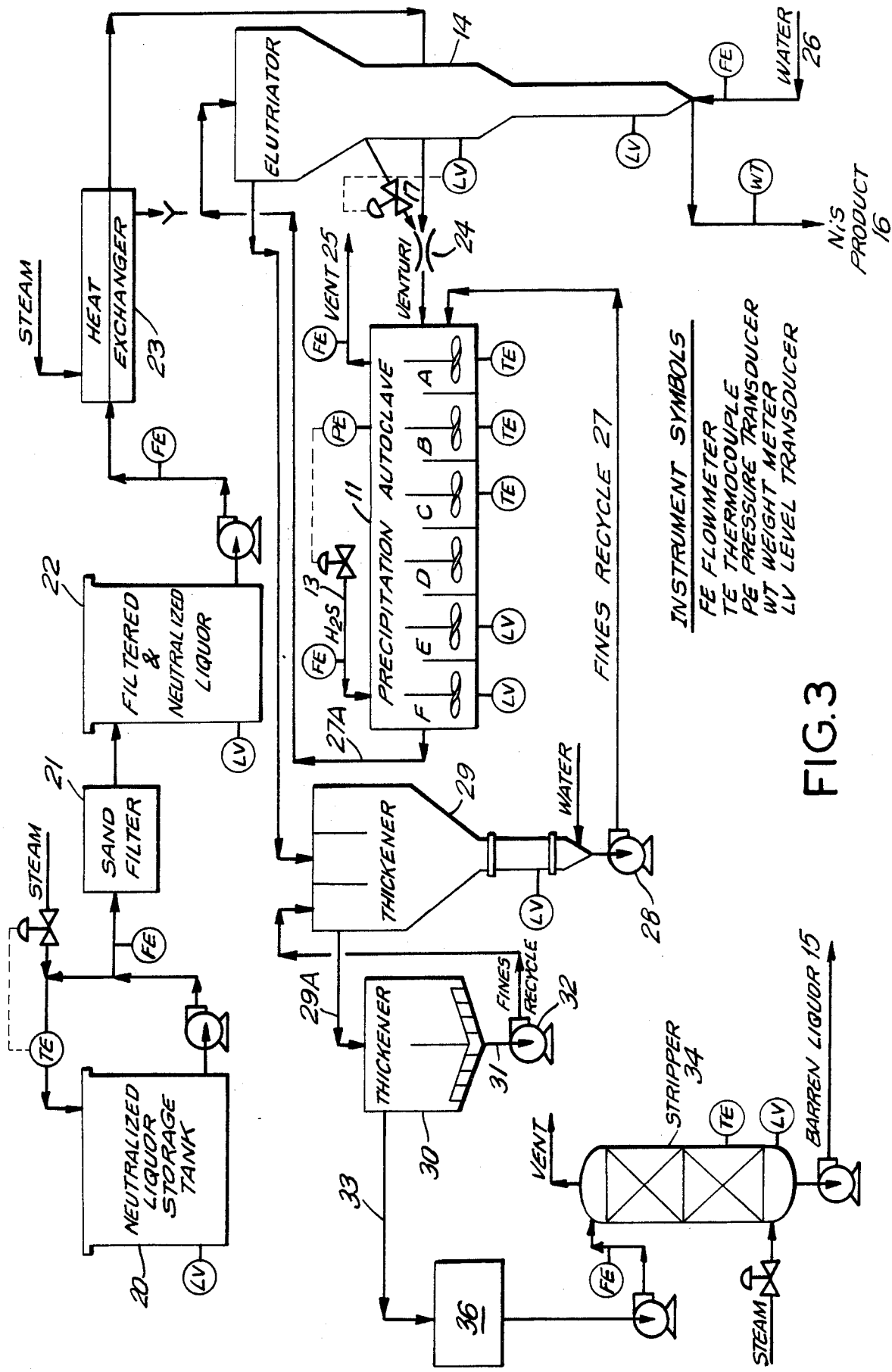
FIG. 3 depicts a flowsheet.

FIG. 3 depicts a process flowsheet wherein neutralized nickel-containing leach liquor from the tank 20 goes through a sand filter 21 which removes entrained solids. Entrained solids are mostly hydroxides, especially ferric hydroxide. Precipitation of ferric hydroxide is normally complete in the leach solution if the pH and temperature conditions are correct. When the pH is low, the precipitation continues in the storage tank upstream of the sand filter. If the pH is high, aluminum starts precipitating.

A storage tank 22 with a 2-hour holding time receives the filtered liquor. The liquor is then pumped through an indirect steam heat exchanger 23 where it is heated to about 100° C., to a venturi 24 where it is mixed with the recycled seed, and then into the autoclave (11).

The autoclave has six agitated compartments, and the H₂S 13 is introduced countercurrent to the liquor. A small amount of H₂S is vented at 25 to eliminate any inert gas that could build up and slow down the reaction.

Slurry 27A exiting the autoclave enters an elutriator 14. An upward flow of water 26 displaces the liquor and washes the particles. The bottom leg of the elutriator holds the coarsest fractions or products that are discharged according to the mass of metal sulfide being produced. The medium-size fractions 17 are removed by the venturi 24 and recycled into the autoclave. Spent liquor and some fine seed are flashed into a thickener 29, where most of the fine seed 27 settles and is recycled to the first compartment of the autoclave with a small peristaltic pump 28. The overflow 29A of the thickener goes to a second thickener 30 where any remaining fines are separated. The underflow 31 of the second thickener, if any, is pumped by pump 32 to the inlet of the first thickener and then recycled to the autoclave.

The clarified liquor 33 exiting the second thickener is stripped with steam in stripper 34 to eliminate dissolved H₂S. The stripped H₂S, as well as the H₂S from the autoclave vent, may be recycled. Part of the barren liquor 15 is used as wash.

As also shown in FIG. 2, a portion of product 16 was ground to an average 12 micrometers particle size and introduced into the first compartment of autoclave 11 to maintain reactor kinetics and high nickel recovery from the feed liquor. The expression "average 12 micrometers particle size" means the size of particle for which 50 percent by weight is equal or larger than 12 micrometers in diameter ($D_{50}$). Character 36 denotes a holding tank for stripper feed.

An example will now be given.

Plant as schematically represented in FIG. 3 of the drawing was set up and was operated for 22 days continuously. The pH of the liquor, which was obtained by acid leaching of blended New Caledonia laterites and garnierites, was maintained between 2.0 and 2.4.

The compositions of the feed liquor and of the barren overflow 33 from thickener 30 are given in the following Table 1:

TABLE 1

| | Average Elemental Concentrations In Feed And Discharge Liquors | |
|---|---|---|
| Component | Feed Liquor (26) gpl | Thickener 30 Overflow (Barren) gpl |
| Ni | 5.09 | 0.034 |
| Co | 0.285 | 0.009 |
| Fe | 0.543 | 0.528 |
| Mn | 1.96 | 1.89 |
| Cu | 0.0130 | 0.0007 |
| Pb | 0.01 | 0.01 |
| Zn | 0.104 | 0.0047 |
| Al | 2.34 | 2.35 |
| Mg | 19.5 | 18.9 |
| Cr | 0.102 | 0.112 |
| SiO₂ | 0.579 | 0.555 |

Average operating conditions for the precipitation autoclave are set forth in Table 2 wherein Column A provides conditions over a 14-day period, and Column B provides conditions over the last 6 days of the 14-day period.

TABLE 2

| Average Precipitation-Autoclave Operating Conditions | | |
|---|---|---|
| | Column A | Column B |
| Feed temperature, °C. | 102 | 100.5 |
| Compartment A temperature, °C. | 94.9 | 95.2 |
| Compartment B temperature, °C. | 96.7 | 96.3 |
| Compartment C temperature, °C. | 95.7 | 95.2 |
| Autoclave pressure, kg/cm² gauge | 1.210 | 1.210 |
| H₂S flow, kg/hr | 7.63 | 7.57 |
| Vent flow, kg/hr | 2.02 | 2.00 |
| Average operating volume, liters | 1450 | 1450 |
| Average residence time, minutes | 57 | 58 |
| Feed flow, kg/hr | 1541 | 1514 |
| Vent 25 temperature, °C. | 62 | 63 |
| Percent seed recycle | 1500 | 1500 |

Average seed concentration within the autoclave during the run was 115 grams per liter, with the range being 101 to 133 grams per liter. The product composition over the run averaged, by weight, 59.55% nickel, 3.15% cobalt, 0.371% iron, 0.0029% manganese, 0.060% aluminum, 1.11% zinc, 0.007% chromium, 0.146% copper, 36.1% sulfur, <0.01% SiO₂, <0.02% Mg and <0.024% lead. Product weight was 294 kg/day on average. Nickel recovery exceeded 99%. Recycled seed sources for the autoclave included the bulk medium-size seed 17 from elutriator 14 and the fines 27 from thickener 26. The amount of fine material from thickener 30 was very small, but this was also returned to the autoclave. As noted in Table 2, seed recycle was 1500% based on product weight.

The average rate of addition of ground nickel sulfide seed having a $D_{50}$ of 12 micrometers was approximately 30 grams per hour or 0.3 percent of production. Average product particle size was 85 to 100 micrometers.

During the run, the seed surface-area concentration was held in the range of 18,000 to 20,000 square centimeters per liter of solution in autoclave 11.

It is to be appreciated that, while a coarse product particle size is desired, there is a limit to the particle size of nickel sulfide which can be maintained in suspension in the sulfidation reactor without excessive power consumption for agitation. Particles as course as 48-mesh (about 320 microns) may be handled although more usually 60-mesh (about 250 microns) particles are more easily suspended. It is also to be appreciated that, as the amount of suspended seed material is increased, the larger the average particle size can be while still maintaining the surface area of the suspended particles within the required range. The capability of working with coarser particles while still maintaining reaction kinetics is highly beneficial from an engineering standpoint since less fine, e.g., groumd, supplemental new nickel sulfide seed is required, the classification to separate recycle seed is simpler, the particle cut for classification is coarser, losses of fines from the system are reduced, the product particle size can be made coarser which improves dewatering and flowability of the product and downstream processing.

At a seed concentration of 120 grams per liter and a nickel content in the feed solution of 5 grams per liter the $D_{50}$ for the seed particles is 50 micrometers at a seed surface area of 30,000 square centimeters per liter and 150 μm at 10,000 cm²/l seed surface area. As is evident from the foregoing description, control of the seed size distribution is effected by adding nuclei. A means of forecasting the future size distribution is required to make adjustments on time. If there is a lack (or an excess) of nuclei fed, it will be indicated first by a decrease (or an increase) of the percent weight of the fine screen fractions. The finer the size, the earlier a change can be detected. On the other hand, the percent weight in the fine fractions is sometimes too small to be accurate and to detect a change.

Table 3 shows the time required after initial introduction of ground seed to see a change, and the percent by weight in various fractions for various seed surface areas.

TABLE 3

Weight Distribution And Time Required To See A Change In The Weight Distribution Of A Given Size Fraction For Various Surface Areas (5)

| | | Size. Mesh | | | |
|---|---|---|---|---|---|
| | | Minus 400 | Minus 325 | Minus 270 | Minus 200 |
| S = 10,000 cm²/l | Retention Time, hr | 12 | 15 | 18 | 25 |
| | % wt. | .2 | .4 | .8 | 3 |
| S = 15,000 cm²/l | Retention Time, hr | 19 | 22 | 27 | 37 |
| | % wt. | 1.0 | 2.0 | 4 | 15 |
| S = 20,000 cm²/l | Retention Time, hr | 25 | 29 | 35 | 49 |
| | % wt. | 3 | 6 | 13 | 46 |
| S = 30,000 cm²/l | Retention Time, hr | 37 | 44 | 53 | N.A. |
| | % wt. | 15 | 30 | 60 | N.A. | note S = seed surface area

There is obviously not one unique fraction that combines the advantage of short response time and reasonable percent by weight for every surface area.

Generally, no more than about 5%, by weight, of fine, e.g., ground supplemental new nickel sulfide seed on the basis of product weight per unit time may be required to secure the benefits of the invention.

In the context of the present description, "supplemental new nickel sulfide seed" means nickel sulfide seed which is prepared to have a controlled particle size designed to maintain the total seed surface area to a desired level. As noted hereinbefore, the various sources of the recycled high seed load in the autoclave do not provide new nuclei but instead become coarser with each of many circuits through the autoclave.

Although the present invention has been described in conjunction with preferred embodiments, it is to be understood that modifications and variations may be resorted to without departing from the spirit and scope of the invention as those skilled in the art will readily understand. Such modifications and variations are considered to be within the purview and scope fo the invention and the appended claims.

What is claimed is:

1. In the method for precipitating nickel as nickel sulfide on a continuous basis from an acidic nickel sulfate solution containing up to about 15 gpl nickel, about 30 to about 400 gpl of a soluble inert sulfate salt and having a pH of about 1.5 to about 4 by means of hydrogen sulfide at a pressure of up to about psig and temperatures of about 65° C. to about 100° C. wherein said solution is fed to a pressurized reactor system along with about 75 up to about 300 gpl of fine nickel sulfide seed material, nickel sulfide is precipitated on the surfaces of said seed material, the solid material from the reactor is classified with the finer material constituting the bulk of the solids being recycled with the coarser material from classification being product, and wherein the surface area of recycled nickel sulfide seed material upon continued operation coarsens such that nickel sulfide production rate becomes uneconomic when said seed surface area concentration drops below 10,000 square centimeters per liter the improvement for controlling the average particle size of the seed material in the reactor within a required size distribution range which comprises introducing therein a small but effective amount up to about 5% of product sulfide weight of fine supplmental new nickel sulfide material from a source in addition to the recycled classified fine material, said supplemental new nickel sulfide seed material being ground to an average particle size $D_{50}$ of about 12 micrometers to provide new nuclei such that the surface area of seed material fed to said reactor is maintained within the range of about 10,000 square centimeters per liter to about 40,000 square centimeters per liter of said sulfate solution and continuous production of nickel sulfide at a high production rate and with high recovery of nickel over an extended period of time is maintained.

2. The method in accordance with claim 1 wherein the total surface area of said nickel sulfide seed particles is about 15,000 to about 20,000 square centimeters per liter of solution.

* * * * *

UNITED STATES PATENT AND TRADEMARK OFFICE
CERTIFICATE OF CORRECTION

PATENT NO. : 4,547,347

DATED : October 15, 1985

INVENTOR(S) : Guy W. Lussiez et al

It is certified that error appears in the above-identified patent and that said Letters Patent is hereby corrected as shown below:

Claim 1, line 25, column 6, before "psig", -- 50 -- should be inserted.

Signed and Sealed this

Twentieth Day of June, 1989

Attest:

DONALD J. QUIGG

Attesting Officer

Commissioner of Patents and Trademarks